United States Patent
Parks (10) Patent No.: US 6,860,525 B2
(45) Date of Patent: Mar. 1, 2005

(54) BREECH LOCK CONNECTOR FOR A SUBSEA RISER

(75) Inventor: William C. Parks, Katy, TX (US)

(73) Assignee: DTC International, Inc., Houston, TX (US)

( * ) Notice: Subject to any disclaimer, the term of this patent is extended or adjusted under 35 U.S.C. 154(b) by 0 days.

(21) Appl. No.: 10/417,970

(22) Filed: Apr. 17, 2003

(65) Prior Publication Data

US 2004/0207202 A1 Oct. 21, 2004

(51) Int. Cl.[7] .............................................. F16L 35/00
(52) U.S. Cl. ...................... 285/391; 285/913; 285/383; 285/371
(58) Field of Search ................................ 285/913, 391, 285/383, 378, 360, 371

(56) References Cited

U.S. PATENT DOCUMENTS

| | | | | |
|---|---|---|---|---|
| 1,054,812 A | * | 3/1913 | Zierath | 403/184 |
| 1,372,238 A | * | 3/1921 | Kreiter | 285/89 |
| 1,494,524 A | * | 5/1924 | Adamson | 89/16 |
| 1,507,877 A | * | 9/1924 | Wilson | 285/391 |
| 1,605,315 A | * | 11/1926 | Wilson | 285/334 |
| 2,172,602 A | * | 9/1939 | Williams | 403/343 |
| 3,361,453 A | * | 1/1968 | Brown et al. | 285/321 |
| 3,540,762 A | * | 11/1970 | Dunlap | 285/391 |
| 3,623,753 A | * | 11/1971 | Henry | 285/330 |
| 3,727,948 A | * | 4/1973 | Current | 285/3 |
| 3,895,829 A | * | 7/1975 | Manson Jr. | 285/3 |
| 5,794,985 A | * | 8/1998 | Mallis | 285/93 |
| 5,950,744 A | * | 9/1999 | Hughes | 175/320 |

* cited by examiner

Primary Examiner—Eric K. Nicholson
(74) Attorney, Agent, or Firm—Bracewell & Patterson, L.L.P.

(57) ABSTRACT

A riser assembly includes riser segments, each having threaded ends. A coupling nut is connected to the threaded end of the first riser segment. The threads of a second riser segment and a set of corresponding threads of the coupling nut are breech threads, which allow the second riser segment to stab into the coupling nut and engage the first riser segment. The coupling nut rotates a portion of a turn in order for the breech threads of the second riser segment and the first riser segment to engage each other. Castellations on the first and second riser segments engage each other to transmit torsional forces from one riser segment to the other instead of through the threads.

26 Claims, 5 Drawing Sheets

BREECH LOCK CONNECTOR FOR A SUBSEA RISER

BACKGROUND OF INVENTION

1. Field of the Invention

The invention relates generally to a subsea riser and more specifically to a breech lock connector between portions of the riser.

2. Background of the Invention

Subsea Riser assemblies allow operations on subsea wells and other subsea equipment from a platform at the surface. Subsea Riser assemblies typically have a plurality of tubular-shaped riser segments that are connected together to make-up the full length of the riser assembly. Operators have attempted numerous connection assemblies in order to connect the ends of the riser segments and make a complete riser assembly reaching from the platform to the subsea well. Some examples of couplings between riser segments include flanged type couplings, clamp type couplings, and dog type couplings. These types of couplings are generally large and heavy because of the loads that are transmitted through the couplings from one riser segment to another.

Another type of coupling used in the past is a threaded coupling. Threaded couplings are generally smaller than other types of couplings, which is advantageous to operators on the platform. Typical threaded couplings include an arrangement having a male pin section attached to an end of a riser segment and a female box attached to an end of another riser segment that engages the threads of the male pin. In some of these threaded couplings, the male and female ends are rigidly attached to the riser segments, which requires that one of the entire riser segments is rotated relative to the other in order for the riser segments to be connected. In other versions, the threaded female end is a separate member that fits between the pins on the two riser segments. The separate member slides over one of the pins, and the inside threading engages the external threading of the other pin. Rotating the separate member relative to the threading on the exterior of one of the pins causes the separate member to compress and engage the other pin in order to connect to the two riser segments. Another threaded coupling includes a union nut that is attached to one of the riser segments and a male pin that is attached to the other riser segment. The union nut is free-spinning relative to the first riser segment. When the union nut spins relative to the male pin, the union nut pulls the two riser segments together and thereby connects the riser segments.

While threaded connections are less bulky and smaller than other couplings, the torsional forces experienced by the riser assembly is transmitted through the threads at each connection from one riser segment to another. The transmission of torque through the threads introduces the possibility of the threads unscrewing or backing off, and thereby causing the riser segments to disengage or causing the connector assembly to lose its sealing properties between riser segments. Additionally, repeated make-up and breakout of the connection may result in damage to the threads and the seals associated with the threaded connections.

SUMMARY OF THE INVENTION

A riser assembly includes a plurality of riser segments. There is a first riser segment with an axial bore and a plurality of helical threads. The first riser segment also has a rim that is located toward the end of the riser segment. The riser assembly also includes a second riser segment that is connected to the first riser segment adjacent the helical threads. The second riser segment has an axial bore and a breech thread extending an opposite direction to the helical threads of the first riser segment. The second riser segment also has a rim that abuts the rim of the first segment. A coupling nut connects the first and second riser segments. The coupling nut has a first portion with a plurality of helical threads formed on its inner surface that matingly engage the helical threads of the first riser segment. The coupling nut has a second portion with a breech thread formed on its inner surface that matingly engages the breech thread of the second riser to secure the riser segments to each other.

The riser assembly typically also includes a keeper that extends through a side of the coupling nut and engages an outer surface of the first riser segment so that the coupling nut does not rotate, and thereby disconnecting the first and second riser segments, after the first and second riser segments are connected. The riser assembly can also include castellations that are formed on the rims of the first and second riser segments. The castellations interlock when the first and second riser segments connect so that torsional forces are transmitted through the castellations rather than through the threads associated with the first and second riser segments and the coupling nut. The riser assembly can also include a seal sub that sealingly engages the interior surfaces of both the first and second riser segments. Typically, a locking member extends through a side of one of the first or second riser segments to secure the seal sub relative to the riser segment the locking member extends through. When the first and second riser segments connect, the seal sub engages the other of the first or second riser segments.

Typically, the seal sub and the connector nut are attached to the first riser segment. The breech threads of the second riser segment and of the coupling nut allow the second riser segment to be stabbed, rather than screwed, into engagement with the first riser segment. When the second riser segment engages the first riser segment, the seal sub is in sealing engagement with both the first and second riser segments. The coupling nut is then secured relative to the first and second riser segments with the keeper.

DETAILED DESCRIPTION OF THE PREFERRED EMBODIMENTS

Figure 1:
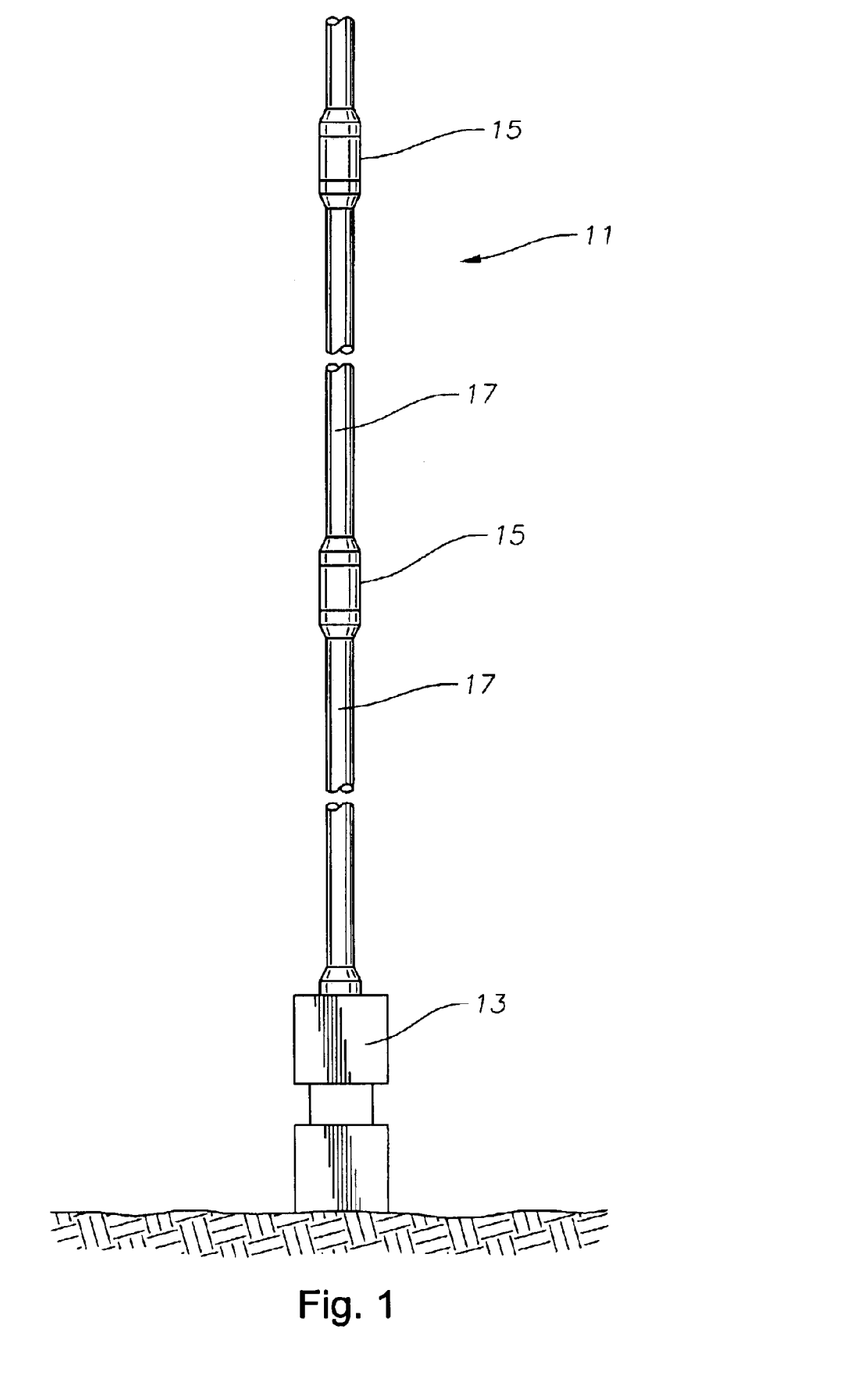
FIG. 1 is an environmental view of a portion of a riser assembly connected to a subsea tree with segments of the riser assembly being connected by a connector constructed in accordance with this invention.

Referring to FIG. 1, a portion of a riser assembly 11 extends from a platform (not shown) on the surface of the sea to a subsea well 13 on the sea floor. A connector assembly 15 connects pairs of riser segments 17 making up the length of riser assembly 11. Riser segments 17 are typically tubular members that allow operators to perform various operations on subsea well 13 from the platform. Riser assembly 11 illustrates a typical subsea riser used for operations on a subsea well. In the preferred embodiment, each connector assembly includes a first pin 19 and a second pin 21. In the preferred embodiment, each riser segment 17 has first pin 19 affixed to one end and second pin 21 affixed to the other end. First pin 19 of one of riser segments 17 connects to second pin 21 of another riser segment 17. In the preferred embodiment, each riser segment 17 is substantially the same by each segment 17 having first and second pins 19 and 21. However, as will be readily appreciated by those skilled in the art, riser segments 17 may have pairs of first pins 19 and pairs of second pins 21 so that riser segments 17 having only first pins 19 are alternated with riser segments 17 having only second pins 19 to construct riser assembly 11.

Figure 2:
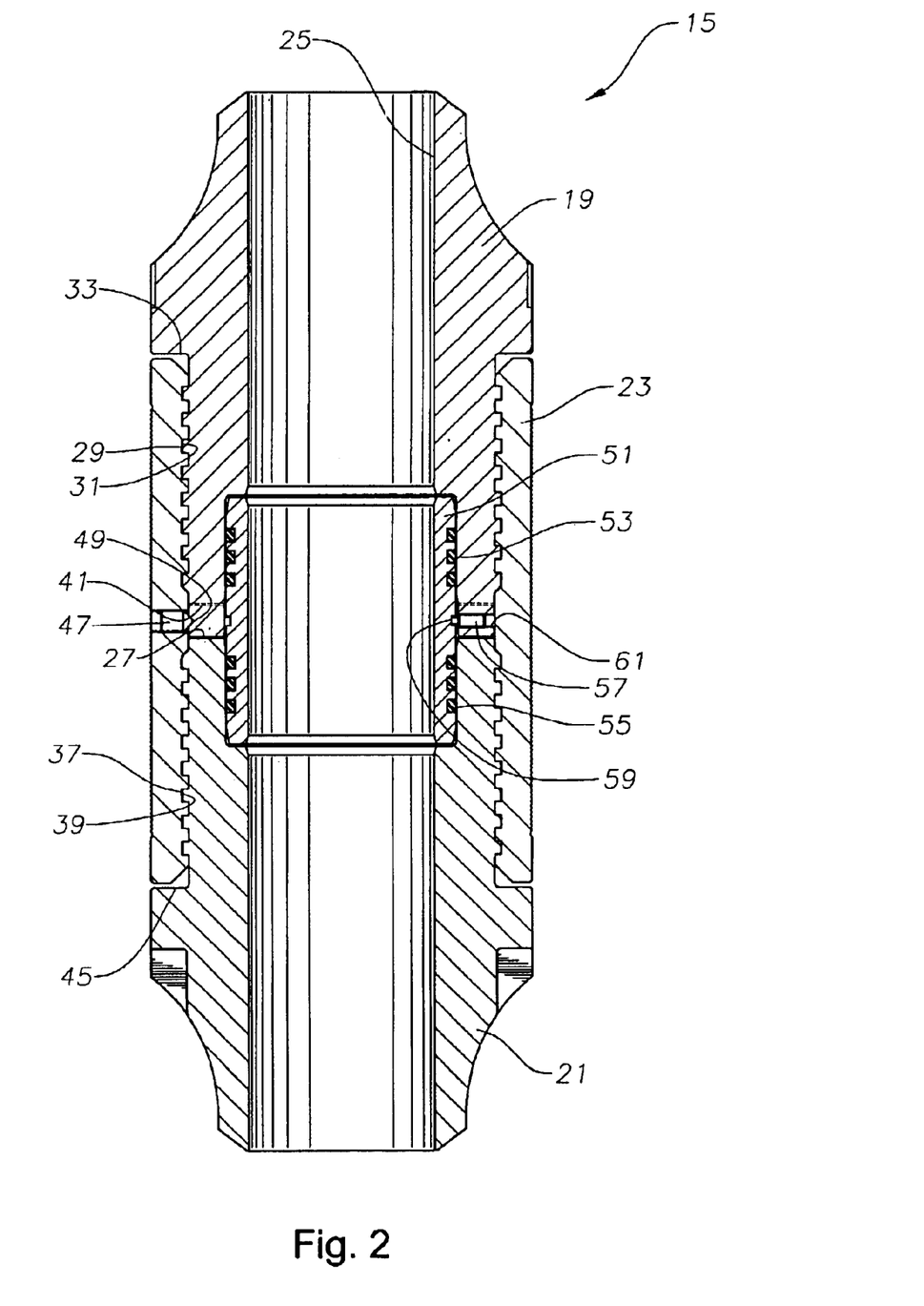
FIG. 2 is a cross-sectional view of the connector shown in FIG. 1.
Figure 3:
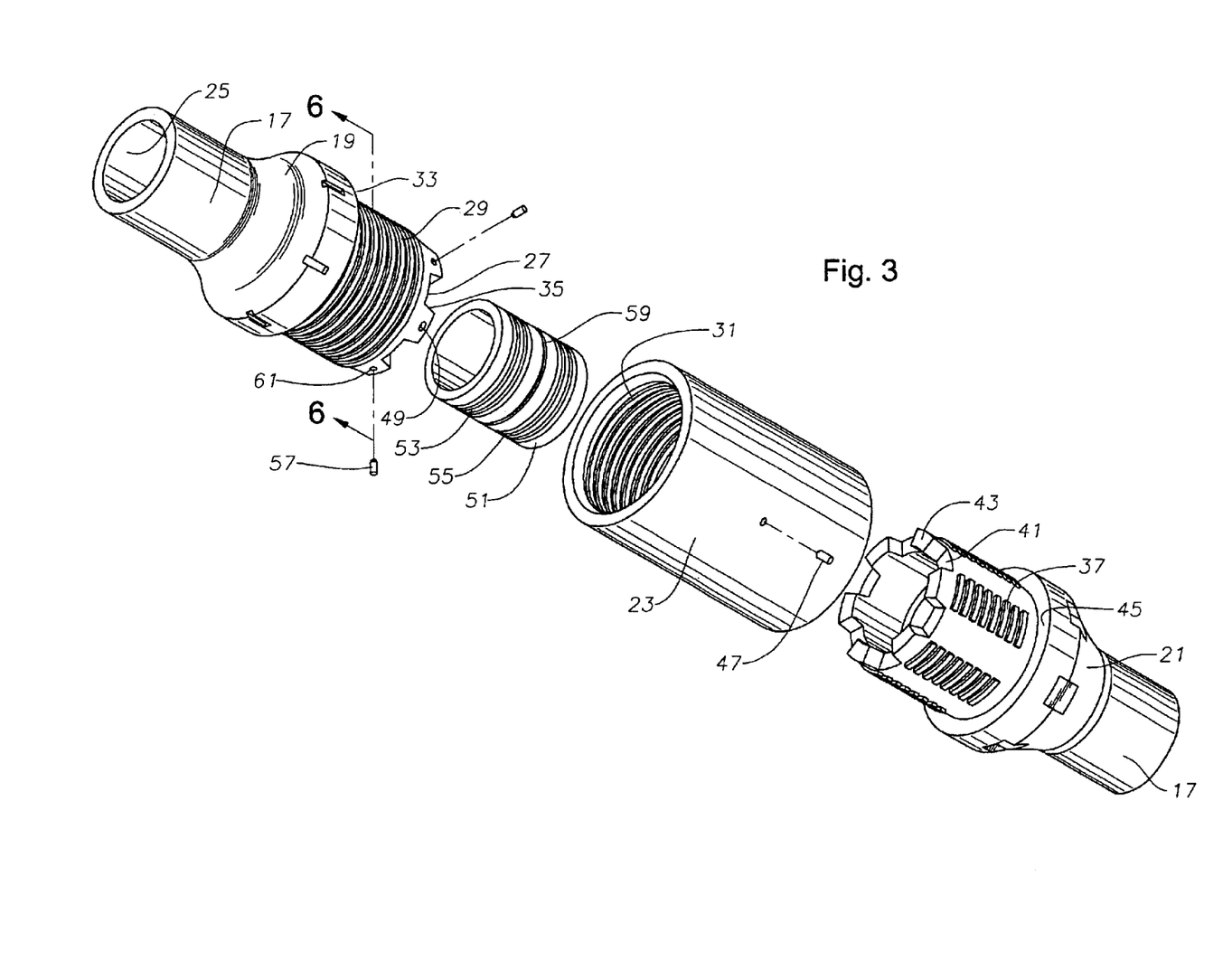
FIG. 3 is an exploded view of the connector shown in FIG. 1.

Referring to FIG. 2, connector assembly 15 is shown with a coupling nut 23 holding first pin 19 and second pin 21 together. In the preferred embodiment, first and second pins 19, 21 are tubular extensions that are welded onto each tubular riser segment 17 (FIG. 1), which allows a riser bore 25 of each segment 17 to extend through each pin 19, 21 when first and second pins 19, 21 engage each other. First pin 19 has a rim 27 located toward the end of first pin 19. Rim 27 engages second pin 21. A set of threads 29 are formed on the outer surface of first pin 19 adjacent rim 27. Threads 29 matingly engage a set of first threads 31 on the interior surface of coupling nut 23 when coupling nut 23 connects to first pin 19. A first pin shoulder 33 is formed adjacent threads 29 away from rim 27. In the preferred embodiment, shoulder 33 has an outer circumference that is larger than the circumferences around threads 29 and rim 27. Shoulder 33 is a physical barrier that limits the portion of first pin that coupling nut 23 engages. In the preferred embodiment, threads 29, 31 are continuous helical threads with crests and valleys that allow crests on threads 31 to slidingly engage valleys between the crests of threads 29 from the portion of threads 29 adjacent rim 27 to the portion of threads 29 adjacent shoulder 33. The number of thread 31 crests along a predetermined axial length of first pin 19 defines a pitch of threads 31. In the preferred embodiment, rim 27 includes a plurality of protrusions or castellations 35 (FIG. 3). Castellations 35 engage second pin 21 when first and second pins 19, 21 are connected.

A set of threads 37 is formed around the outer surface of second pin 21, which is a single diameter cylindrical surface in the preferred embodiment. Alternatively, the upper portion of the outer surface of pin 21 could be a smaller diameter than a lower potion. In the preferred embodiment, as shown in FIG. 3, threads 37 are breech threads, forming axial rows or columns that are uniformly spaced around the outer surface of second pin 21. Threads 37 make up a single continuous helical thread that is interrupted by the axially extending spaces. Alternatively, threads 37 could be multi-start rather than single start. In the preferred embodiment, each column in threads 37 has a plurality of shoulders or crests extending partially around the circumference of second pin 21. The spaces between the columns of threads 37 are uniform in the preferred embodiment. As will be appreciated by those skilled in the art, the number of shoulders or segments of the threads 37 in each column is determined based upon stresses experienced by riser segments pulling away from each other, shape or form of the shoulders, material of the threads, and other factors common in determining what is required to withstand predetermined force loads.

Figure 5:
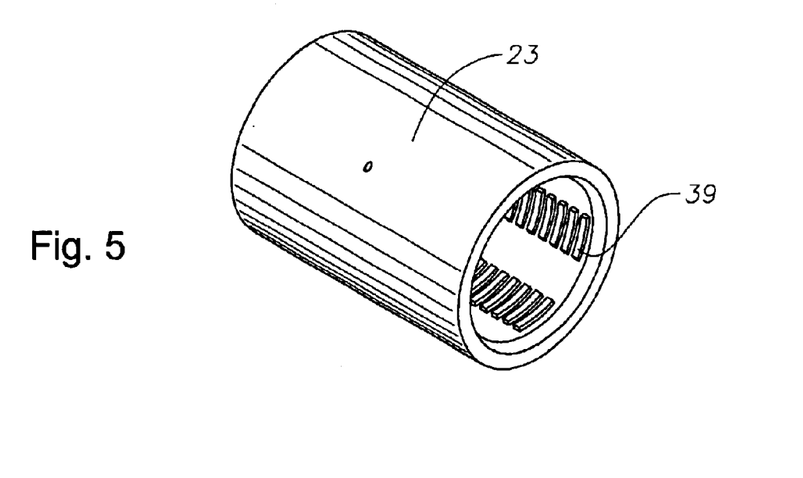
FIG. 5 is a perspective view of the coupling nut of the connector shown in FIG. 1, shown from an end opposite that shown in FIG. 3.

As shown in FIG. 2, a set of second threads 39 are formed on the lower half of the interior surface of coupling nut 23 for engaging threads 37. Referring to FIG. 5, in the preferred embodiment, second threads 39 are also breech threads or intermittently spaced threads or protuberances that formed in axial columns around the interior surface of coupling nut 23. Threads 31 in the upper half of connector 23 are continuous, rather than being breech threads. The circumferential width of each column of threads 39 is less than the gaps or spaces between breech threads 37 on second pin 21. Preferably, threads 39 are formed so that the columns of threads 39 can slidingly engage second pin 21 between the columns of threads 37 until second pin 21 engages rim 27 of first pin 19. In the preferred embodiment, the threads or protuberances in the axial column of threads 39 align with valleys between the crests in the column of threads 37 on second pin 21 when second pin 21 engages first pin 19. Coupling nut 23 is rotated a predetermined amount less than one turn so that the column of threads 39 on coupling nut 23 slidingly engage the crests of the column of threads 37 of second pin 21. Referring to FIG. 3, in the preferred embodiment, threads 37 on second pin 21 are reversed relative to threads 29 on first pin 19, which allows threads 31 and 39 on connector nut 23 to slidingly engage threads 29, 37 as connector nut 23 rotates around first and second pins 19, 21. That is, threads 29 are preferably clockwise and threads 37 are preferably counterclockwise.

Referring back to FIG. 2, second pin 21 preferably includes a rim 41 located adjacent threads 37, which includes a portion that engages castellations 35 of first pin 19. Rim 41 includes castellations 43 (FIG. 3) that matingly engage castellations 35 on first pin 19 when first and second pins 19, 21 connect. In the preferred embodiment, castellations 35, 43 interlock so that castellations 35 engage rim 41, more particularly the sides of castellations 43, and castellations 43 engage rim 27, more particularly the sides of castellations 35 when first and second pins 19, 21 connect. In an alternative embodiment, a liner or spacer (not shown) can optionally be positioned between rims 27 and 41. In this alternative embodiment, castellations 35, 43 engage each other through the liner or spacer. Castellations 35, 43 transmit torsional forces when one of riser segments 17 tries to rotate relative to the other riser segment 17 so that the torsional forces are not transmitted to threads 31, 37 and coupling nut 23.

In the preferred embodiment, second pin 21 includes a shoulder 45 located adjacent threads 37 axially away from rim 41. In the preferred embodiment, shoulder 45 has an outer circumference that is larger than the circumferences around rim 41 and threads 37. First and second pins 19, 21 engage each other before coupling nut 23 contacts shoulder 45. Preferably, coupling nut 23 also does not contact shoulder 45 after coupling nut is rotated to engage threads 37 on second pin 21 with threads 39 of coupling nut 23.

Figure 6:
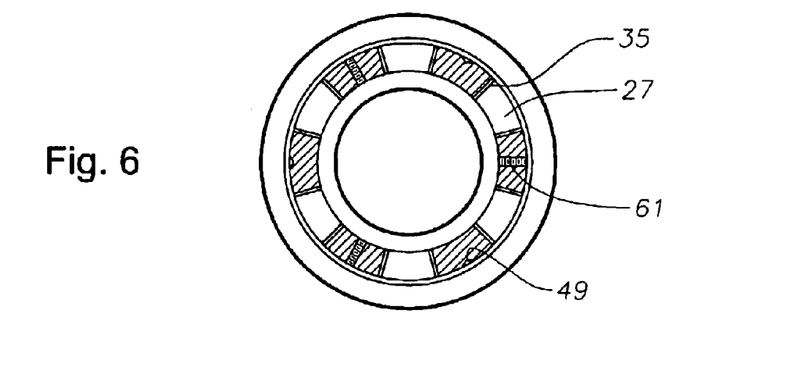
FIG. 6 is a cross-sectional view of the first pin taken viewed along line 6—6 of FIG. 3.

Referring to FIGS. 2 and 3, a keeper 47 extends through a side of coupling nut 23 and engages a recess 49 formed in one of first or second pins 19, 21. In the preferred embodiment, keeper 47 is a threaded fastener, typically a screw, which is screwed into the side of coupling nut 23 until keeper 47 extends into recess 49. In an embodiment not shown, keeper 47 is alternatively a spring pin with a predetermined spring load that allows coupling nut 23 to rotate around first and second pins 19, 21 until the spring pin aligns and extends into recess 49. In the preferred embodiment, as shown in FIG. 3, recesses 49 are formed in castellations 35 of first pin 19. Recesses 49 could alternatively be formed in castellations 43 of second pin 21. Referring to FIG. 6, in the preferred embodiment, recesses 49 are formed in a plurality of alternating castellations 35, each of which receives a keeper 47. Having a plurality of keepers 47 extending through the side of coupling nut 23 at various locations around coupling nut 23 reduces the forces experienced by each keeper 47 while preventing coupling nut 23 from backing-off and holding first and second pins 19, 21 relative to each other.

Referring to FIGS. 2 and 3, in the preferred embodiment, a seal sub 51 is located within recessed portions of the interior of first and second pins 19, 21. A first seal element 53 extending around the outer surface of seal sub 51 sealingly engages the interior surface of first pin 19 when first pin 19 receives seal sub 51. A second seal element 55 extends around the outer surface of seal sub and engages the interior surface of second pin 21 when first and second pins 19, 21 connect. Seals 53, 55 can be elastomeric seals or metal to metal seals. In the preferred embodiment, a locking member 57 extends through a side of first pin 19 and engages the outer surface of seal sub 51 to secure seal sub 51 relative to first pin 19. In the preferred embodiment, there are a plurality of locking members 57, and the locking members extend through alternating castellations 35 of first pin 19 to engage seal sub 51 between first and second seals 53, 55. Seal sub 51 preferably includes a circumferential recess 59 formed on the outer surface of seal sub for receiving the plurality of locking members 57. In the preferred embodiment, locking members 57 are typically threaded fasteners or screws. A plurality of predrilled holes 61 are preferably located in alternating castellations 35 for receiving locking members 57.

In operation, first and second pins 19, 21 are typically welded onto riser segments 17 before being shipped to the platform. While determining which pairs of riser segments 17 to connect to each other in order to construct riser assembly 11, the operator arranges segments 17 so that a first pin 19 on one riser segment 17 connects to a second pin 21 on another riser segment 17. A portion of seal sub 51 is inserted into first pin 19 so that first set of seals 53 engage the interior surface of first pin 19. Locking members 57 are then inserted through holes 61 in castellations 35 and to engage recess 59 on seal sub 51, thereby securing seal sub 51 to first pin 19. Connector nut 23 screws in a first direction onto threads 29 on first pin 19 after installing seal sub 51 into first pin 19. Preferably, connector nut 23 engages first pin 19 until connector nut 23 abuts shoulder 33.

Another riser segment 17 having second pin 21 is positioned adjacent first pin 19 and connector nut 23. Typically one riser segment 17 with a pin 21 facing upward will be suspended vertically at the platform. A second riser segment 17 will be held vertically in place below the suspended riser segment 17 with an assembly (not shown). Suspended riser segment 17 is rotated so the castellations 35 of pin 19 align with castellations 43 of pin 21. Connector nut 23 may be rotated slightly so that second connector nut threads 39 align with the gaps between second pin threads 37. Connector nut 23 is then stabbed over second pin 21 with second connector nut threads 39 engaging the surface of second pin 21 between threads 37 until first and second pins 19, 21 connect with second pin castellations 43 engaging first pin rim 27 and first pin castellations 35 engaging second pin rim 41. In the preferred embodiment, the interior surface of second pin 21 receives a portion of seal sub 51 and sealingly engages second seals 55 when first pin 19 is stabbed into engagement with second pin 21. Connector nut 23 is then rotated an increment less than one turn in a second direction, which is opposite from the first direction in order to screw connector nut 23 onto second pin 21, so that second connector nut threads 39 engage second pin threads 37. The operator then inserts keepers 47 through sides of connector nut 23, which engage recesses 49 on the outer surface of seal sub 51. The operator can repeat this procedure as desired until riser assembly 11 extends to well head 13.

Figure 4:
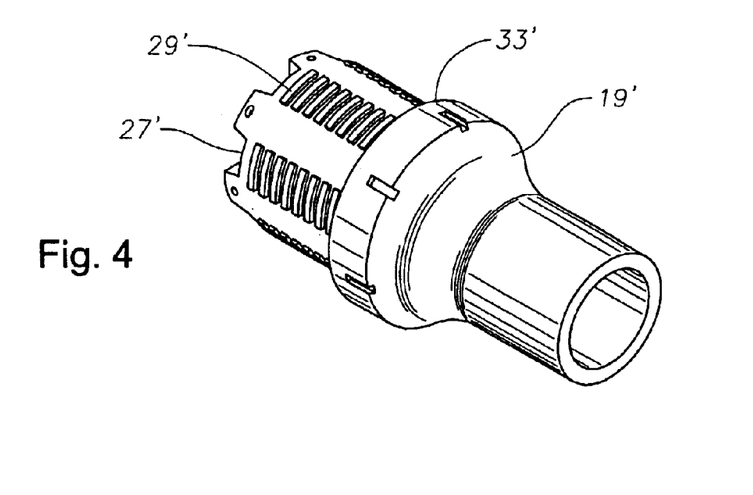
FIG. 4 is a perspective view of an alternative embodiment of the first pin of the connector shown FIG. 1.

In an alternative embodiment, as shown in FIG. 4, threads 29' of first pin 19' are also interrupted or breech threads with axial portions of threads 29' removed so that columns of threads extend axially along the outer surface of pin 19' between rim 27' and shoulder 33'. In this alternative embodiment, the axial columns of threads 29' are spaced around the circumference of first pin 19'. In this alternative embodiment, a first set of connector nut threads (not shown) would be breech or intermittently spaced threads similar to second set of connector nut threads 39 discussed above and shown in FIG. 5. Therefore, in this alternative embodiment, the connector nut (not shown) has two sets of breech threads. The second set of threads (not shown) are formed in axial columns of threads that slidingly engage first pin 19' between first pin threads 29'. After sliding the connector nut with two sets of breech threads along first pin 19' until contacting shoulder 33', the connector nut only needs to be rotated an increment of a rotation around first pin 19' in order to engage first pin 19' as desired. The alternative embodiment shown in FIG. 4 is faster than the preferred embodiment due to the fact that both first and second pins 19', 21 have breech threads, which removes the step of screwing connector nut 23 along the entirety of first pin threads 29.

Figure 7:
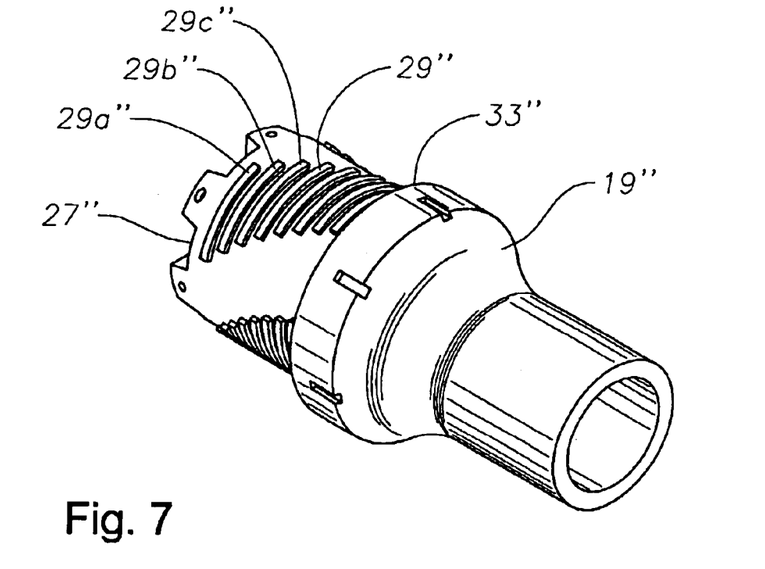
FIG. 7 is a perspective view of another alternative embodiment of the first pin of the connector shown FIG. 1.
Figure 8:
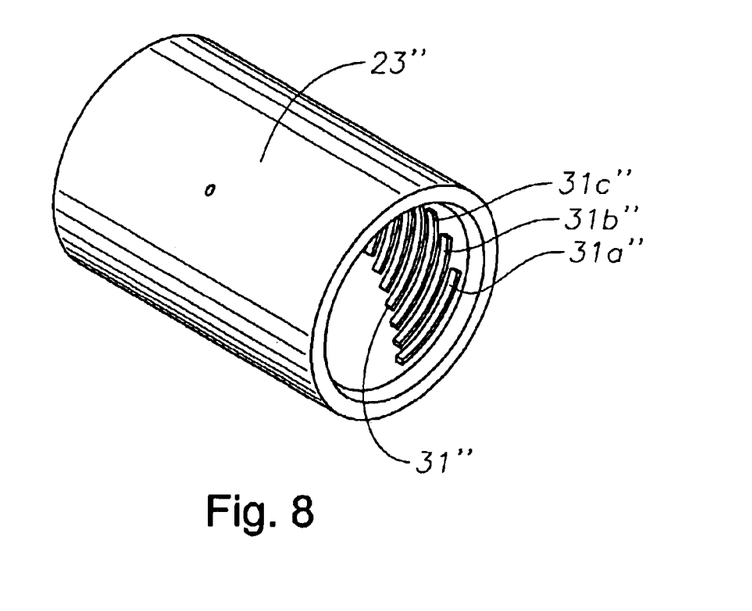
FIG. 8 is a perspective view of an alternative embodiment of the coupling nut of the connector shown in FIG. 1, and showing the end that receives the first pin shown in FIG. 7.

Referring to FIGS. 7 and 8, in another alternative embodiment, threads 29" of first pin 19" are interrupted or breech threads. Threads 29" are discontinuous, or portions of threads 29" are removed, so that columns of threads 29" extend diagonally along the outer surface of pin 19" between rim 27" and shoulder 33". In this alternative embodiment, threads 31" of coupling nut 23" are interrupted or breech threads having columns that extend diagonally along the inner surface of coupling nut 23". Preferably, threads 29" are offset from each other so that threads 31" cannot slide through the diagonal column of breech threads 29" without rotating coupling nut 23".

In operation, coupling nut 23" receives a portion of first pin 19" so that the first row of threads 31a" slide between the first row of threads 29a". The second row of threads 29b" prevent first row of threads 31a" from sliding axially beyond the first row of threads 29a" until coupling nut 23" is rotated an increment of a turn. After turning coupling nut 23", coupling nut 23" slides axially further along first pin 19", thereby receiving another portion of first pin 19" with the first row of threads 31a" sliding between second row of threads 29b" and the second row of threads 31b" sliding between the first row of threads 29a". The third row of threads 29c" prevents first row of threads 31a" from sliding beyond the second row of threads 29b" until coupling nut 23" is rotated another increment of a turn.

This process of sliding and rotating coupling nut 23" is preferably repeated until the first row of threads 31" is located between the row of threads 29" axially farthest from rim 27" and closest to first pin shoulder 33". In this embodiment, threads 29", 31" engage each other so that coupling nut 23" cannot slide relative to first pin 19" unless coupling nut 23" is rotated. Additionally, this embodiment provides resistance to coupling nut 23" backing-off from first pin 19" because each row of threads 31" are located circumferentially between each row of threads 29". Therefore, the diagonal orientation the breeches of threads 29", 31" helps provide incremental physical barriers to both axial and rotational movement of coupling nut 23" relative to first pin 19".

In the preferred embodiment, riser segments 17, and first and second pins 19, 21 are made from titanium for providing a stronger, lighter weight riser assembly 11 due to its lower weight and higher yield strength compared to previous riser assemblies. Manufacturing segments 17 and pins 19, 21 with titanium also increases the flexibility of the riser due to the lower modulus of elasticity of titanium compared to steel. Connector nut 23 and seal sub 51 can also be manufactured with titanium or other materials as desired for operating conditions. For example, other materials including but not limited to steel, aluminum and other alloys can be used.

In the embodiments discussed above and shown in more particularly in FIG. 2, threads 29, 31, 37, 39 have a square thread form or cross-section. As will be appreciated by those skilled in the art, numerous other thread forms could be used for threads 29, 31, 37, 39. For example, other thread forms for threads 29, 31, 37, 39 include but are not limited to acme threads, stub-acme thread, buttress threads, or other profiles such as shoulders and protrusions or lugs.

Those skilled in the art will readily appreciate that having breech or interrupted threads for second pin threads 37 increases the efficiency and reduces the time required for making-up or constructing riser assembly 11 compared to previous connector assemblies in the art. Additionally, the wear of connector assembly threads 29, 31, 37, 39 and seals 53, 55 is reduced because torque is transmitted from one riser segment 17 to another through castellations 35, 43 rather than through the threads on the connector assembly like other connectors already known in the art. Transmitting torque through castellations 35, 43 also reduces the likelihood of connector nut 23 unscrewing or backing-off, and thereby causing riser segments 17 to disengage or causing connector assembly to lose its sealing properties between riser segments.

Further, it will also be apparent to those skilled in the art that modifications, changes and substitutions may be made to the invention in the foregoing disclosure. Accordingly, it is appropriate that the appended claims be construed broadly and in the manner consisting with the spirit and scope of the invention herein. For example, in all the embodiments shown, pins 47 engage castellations 35 on first pin 19, however pins 47 can engage castellations 43 on second pin 21.

What claimed is:

1. A pipe assembly for oil and gas production from a subsea well, comprising:
    a first pipe segment having an axial bore and a plurality of external threads and a rim;
    a second pipe segment having an axial bore and a plurality of external breech threads extending in an opposite direction to the external threads of the first pipe segment, the second pipe segment having a rim that engages the rim of the first pipe segment;
    a coupling nut having a first portion with a plurality of internal threads that matingly engage the external threads of the first pipe segment and a second portion with a plurality of internal breech threads that matingly engages the external breech threads of the second pipe to secure the pipe segments to each other;
    a seal sub that sealingly engages an interior surface of the first pipe segment and an interior surface of the second pipe segment when the rims of the first and second pipe segments engage each other; and
    a retainer that engages an outer surface of the seal sub and one of the first and second pipe segments to hold the seal sub relative to said one the first and second pipe segments when the rims of the first and second pipe segments are not engaging each other.

2. The assembly of claim 1, wherein the external threads of the first pipe segment are helical.

3. The assembly of claim 1, wherein the external threads of the first pipe segment are breeched.

4. The assembly of claim 3, wherein the breech of the external threads forms axial columns of threads.

5. The assembly of claim 3, wherein the breech of the external threads forms diagonal columns of threads.

6. The assembly of claim 1, wherein the external threads of the first pipe segment are helical and continuous.

7. The assembly of claim 1, further comprising oppositely facing castellations located on the rims of the first and second pipe segments that engage each other when the rim of the second pipe segment connects with the rim of the first pipe segment.

8. The assembly of claim 1, wherein the outer surface of the seal sub defines a recess that receives a portion of the retainer for the retainer to engage the outer surface of the seal sub.

9. The assembly of claim 8, wherein the retainer is a retainer pin extending through a side of at least one of the first or second riser segments, to secure the seal sub relative to said one of the first or second pipe segments.

10. The assembly of claim 1, further comprising a coupling pin that is inserted through a side of the coupling nut and engages one of the first or second pipe segments for securing the coupling nut relative to the one of the first or second pipe segments.

11. The assembly of claim 1, wherein the external breech threads on the second pipe segment comprises a plurality of thread sections that are circumferentially spaced around an outer circumference of the second pipe segment.

12. The assembly of claim 11, wherein each of the thread sections comprises a plurality of shoulders forming axially extending columns.

13. The assembly of claim 1, wherein a pitch of the external threads on the first pipe segment is substantially the same as a pitch of the external breech threads on the second pipe segment.

14. The assembly of claim 1, wherein the seal sub that sealingly engages an interior surface of the first pipe segment and an interior surface of the second pipe segment with a metal to metal seal when the rims of the first and second pipe segments engage each other.

15. The assembly of claim 9, wherein the retainer pin extending through a side of at least one of the first or second riser segments extends through one of a plurality of oppositely facing castellations located on the rims of the first and second pipe segments that engage each other when the rim of the second pipe segment connects with the rim of the first pipe segment.

16. A pipe assembly for oil and gas production from a subsea well, comprising:
    a first pipe segment having an axial bore, a breeched external thread and a rim;
    a second pipe segment having an axial bore and a plurality of circumferentially spaced apart external shoulders formed thereon, the second pipe segment having a rim that engages the rim of the first pipe segment;
    a coupling nut having a first portion with an internal thread that matingly engages the external thread of the first pipe segment, and a second portion with a plurality of circumferentially spaced apart protuberances formed on an inner surface that matingly engage the external shoulders to secure the pipe segments to each other;

a plurality of oppositely facing castellations located on the rims of the first and second pipe segments that engage each other when the rim of the second pipe segment and the rim of the first pipe segment engage each other; and a seal sub that sealingly engages an interior surface of the first pipe segment and an interior surface of the second pipe segment when the rims of the first and second pipe segments engage each other, and a retainer that engages an outer surface of the seal sub to secure the seal sub relative to one of the first and second pipe segments when the rims of the first and second pipe segments are not engaging each other.

17. The assembly of claim 16, wherein the external shoulders on the second pipe segment define spaced-apart axially extending columns around an outer circumference of the second pipe segment.

18. The assembly of claim 16, further comprising a coupling pin that is inserted through a side of the coupling nut and engages one of the riser segments for securing the coupling nut relative to the first riser segment.

19. The assembly of claim 16, wherein the external shoulders on the second pipe_segment and the protuberances formed on an inner surface of the coupling nut extend helically.

20. A pipe assembly for oil and gas production from a subsea well, comprising:

a first pipe segment having an axial bore and a continuous thread and a rim;

a second pipe segment having an axial bore and a plurality axially extending columns of threads formed thereon, the second pipe segment having a rim that engages the rim of the first pipe segment;

a coupling nut having a first portion with a continuous thread formed on its inner surface that matingly engages the continuous thread of the first pipe segment and a second portion with a plurality of axially extending columns of threads formed on its inner surface that matingly engages the plurality of axial columns of threads of the second pipe segment to secure the pipe segments to each other;

a plurality of oppositely facing castellations located on the rims of the first and second pipe segments that engage each other when the rim of the second pipe segment and the rim of the first pipe segment engage each other;

a seal sub that sealingly engages a portion of an interior surface of the first pipe segment and an interior portion of the second pipe segment when the rims of the first and second pipe segments engage each other; and a retainer pin that engages an outer surface of the seal sub and one of the first and second pipe segments to hold the seal sub relative to said one the first and second pipe segments when the rims of the first and second pipe segments are not engaging each other.

21. The assembly of claim 20, further comprising a pin that is inserted through a side of the coupling nut and engages the first pipe segment for securing the coupling nut relative to the first pipe segment.

22. The assembly of claim 20, wherein a pitch of the continuous thread and a pitch of the columns of threads are the same.

23. The assembly of claim 20, wherein a cross-section of the continuous thread defines a thread form, and the thread form is substantially the same as a thread form of the columns of threads.

24. The assembly of claim 20, further comprising a first shoulder located on the first pipe segment that limits axial movement of the coupling nut beyond the continuous thread, and a second shoulder located on the second pipe segment that limits axial movement of the coupling nut beyond the columns of threads formed thereon.

25. The assembly of claim 20, wherein the outer surface of the seal sub defines a recess that receives a portion of the retainer pin for the retainer pin to engage the outer surface of the seal sub.

26. The assembly of claim 20, wherein the retainer pin extends through one of the castellations formed on the rim of said one the first and second pipe segments to engage the outer surface of the seal sub.

* * * * *